United States Patent
Ohlendorf

(10) Patent No.: US 8,636,084 B2
(45) Date of Patent: Jan. 28, 2014

(54) AUXILIARY DEVICE AND A SYSTEM COMPOSED OF AN ELECTRICAL WORK MACHINE COMPRISING AN AUXILIARY DEVICE

(75) Inventor: Oliver Ohlendorf, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 342 days.

(21) Appl. No.: 13/096,555

(22) Filed: Apr. 28, 2011

(65) Prior Publication Data

US 2011/0266016 A1    Nov. 3, 2011

(30) Foreign Application Priority Data

Apr. 28, 2010    (DE) .......................... 10 2010 028 302
May 25, 2010    (EP) ...................................... 10163743

(51) Int. Cl.
*B25D 17/14*    (2006.01)

(52) U.S. Cl.
USPC .......................................................... 173/198

(58) Field of Classification Search
USPC .......................................................... 173/198
See application file for complete search history.

(56) References Cited

U.S. PATENT DOCUMENTS

| | | | |
|---|---|---|---|
| 4,205,728 A | 6/1980 | Gloor et al. | |
| 6,004,194 A * | 12/1999 | Hild et al. | 451/357 |
| 6,932,546 B2 * | 8/2005 | Ohlendorf | 408/234 |
| 2007/0261871 A1 * | 11/2007 | Ohlendorf | 173/212 |
| 2010/0155095 A1 * | 6/2010 | Furusawa et al. | 173/198 |
| 2010/0181087 A1 * | 7/2010 | Schoeps | 173/200 |
| 2011/0308830 A1 * | 12/2011 | Furusawa et al. | 173/198 |

FOREIGN PATENT DOCUMENTS

| | | |
|---|---|---|
| DE | 7404896 U | 10/1974 |
| DE | 2744463 | 1/1987 |
| DE | 9306373 U1 | 6/1993 |
| DE | 102005058791 B3 | 11/2006 |
| DE | 202007010514 U1 | 10/2007 |
| EP | 1714735 A1 | 10/2006 |
| FR | 2763528 B1 | 8/1999 |
| GB | 1334366 A | 10/1973 |

OTHER PUBLICATIONS

European Search Report in Application No. 10163743.7-2302, dated Aug. 4, 2011 (7 pages).

* cited by examiner

*Primary Examiner* — Brian D Nash
(74) *Attorney, Agent, or Firm* — McAndrews, Held & Malloy, Ltd.

(57) ABSTRACT

An auxiliary device for an electrical work machine is provided. The auxiliary device can be attached to the electrical work machine, and the electrical work machine can be equipped with a tool in a tool holder. The auxiliary device comprises a housing comprising a handle and an attaching device. The housing can be attached to the electrical work machine with the attaching device. The housing comprises a handling section, which is disposed next to the attaching device, and which comprises an opening, which allows at least the tool holder to be freely accessible from the sides. The handle is permanently connected to the handling section.

16 Claims, 4 Drawing Sheets

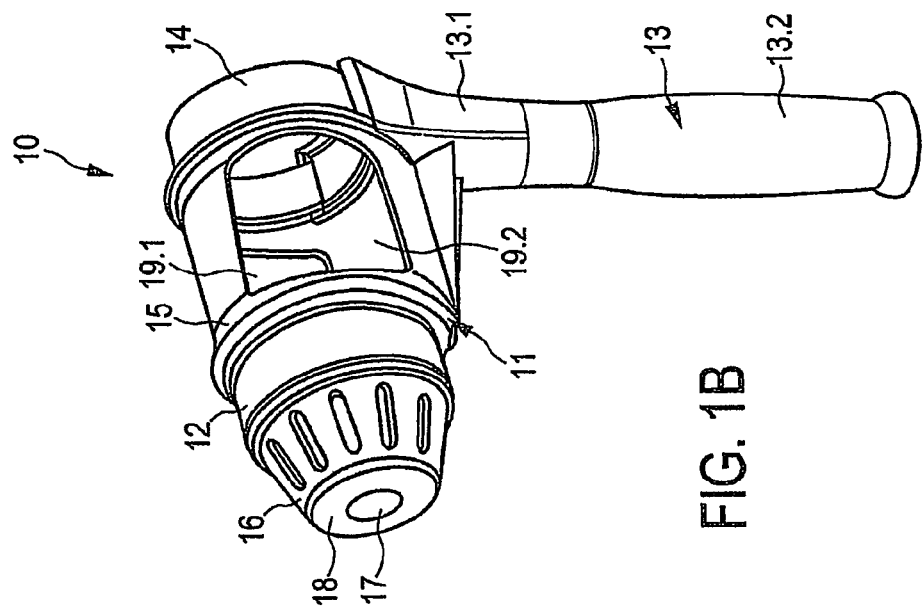
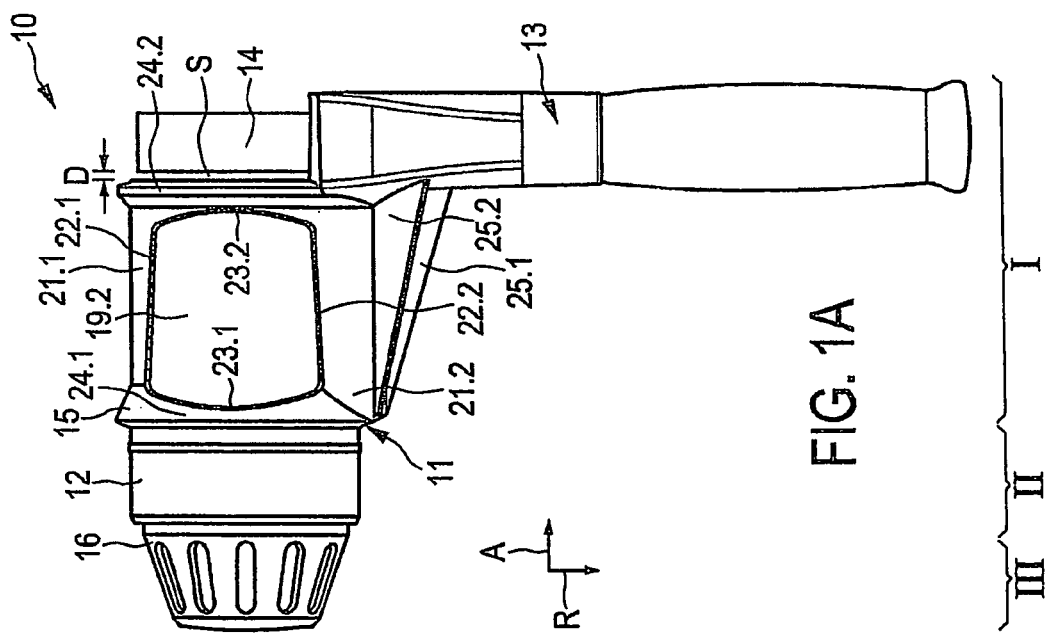

AUXILIARY DEVICE AND A SYSTEM COMPOSED OF AN ELECTRICAL WORK MACHINE COMPRISING AN AUXILIARY DEVICE

RELATED APPLICATIONS

The present application claims priority to German Patent Application DE 102010028302.9, filed Apr. 28, 2010, entitled "Auxiliary Device and a System Composed of an Electrical Work Machine Comprising an Auxiliary Device," and to EP Patent Application 10163743.7, filed May 25, 2010, the entire content of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to an auxiliary device for use with an electrical work device. The invention also relates to a system composed of an electrical work machine and an auxiliary device.

An electrical work machine of the aforementioned type serves primarily for processing mineral material such as stone, concrete or the like. For this purpose, the electrical work machine can be equipped with a tool, for example, in the form of a drill bit or a chisel, which is mounted in the tool holder of the electrical work machine by means of a shaft. In processing or comminuting operations of mineral material such as stone or concrete, and also wood or the like, the tool holder must be protected from any accumulating dust, shavings or other comminuted material by means of the aforementioned auxiliary device or the comminuted material should be collected and optionally discharged by the auxiliary device. The auxiliary device is attached to the electrical work machine by means of an attaching device, for example, with a clamping effect, and the electrical work machine can additionally be held by means of a handle of the auxiliary device.

An auxiliary device of the applicant is known in the form of a suction attachment in DE2744463C2, for example. An auxiliary device that is provided with a suction device and that has no handle is described in GB 1334366, for example.

An auxiliary device, which can be attached to the electrical work machine and which comprises a suction head and a handle, is described in DE 2005 058 791 B3 or FR 2763528, for example. An aforementioned auxiliary device and an aforementioned system composed of an electrical work machine comprising an auxiliary device is disclosed in DE 740 48 96 U1. The auxiliary device surrounds particularly the tool holder with a collecting chamber for comminuted material and discharges the same by way of the handle of the auxiliary device. The auxiliary device is attached to a neck region of a housing of the electrical work machine.

Such an auxiliary device and such a system composed of an electrical work machine and an auxiliary device can be improved still further. It has been observed that there can result an undesirable contact between the tool holder and the auxiliary device of the aforementioned type during the operation of an electrical work machine—more particularly, a percussion drilling machine, a hammer drill or a chipping hammer as well as comparable combined drilling machines. This undesirable contact can lead to an undesirable coupling and force transfer between the auxiliary device and the electrical work machine, for example, a rotation of the entire auxiliary device comprising the suction units optionally connected thereto during drilling operations. This can unnerve or even injure the user. It can also result in damage to the auxiliary device, more particularly a suction unit.

Furthermore, it has been observed that the aforementioned system composed of an electrical work machine and an auxiliary device, when put down, can primarily result in an impact loading of the auxiliary device, for example, when the electrical work machine is dropped such that the front end of the auxiliary device faces downward. In such cases, the housing of the auxiliary device in the known systems could strike the tool holder. In particular, a mounting method known in the prior art for mounting the auxiliary device on the electrical work machine results in such impacts being transferred directly to the housing of the electrical work machine. Impacts and shocks occurring during the operation of the electrical work machine can also adversely affect the user when the auxiliary device is mounted on the electrical work machine by the use of the known mounting method that is in need of further improvement.

It would be desirable to prevent adverse effects during the operation and/or handling of an electrical work machine comprising an auxiliary device. One object of the present invention is to specify an auxiliary device and a system composed of an electrical work machine and an auxiliary device which are improved as compared to the prior art. One particular aim is to avoid the aforementioned disadvantages of an auxiliary device and a system composed of an electrical work machine and the auxiliary device. Another aim is to improve an auxiliary device and a system composed of an electrical work machine and an auxiliary device in such a way that a disadvantageous interaction between the auxiliary device and the electrical work machine during the operation and handling thereof is largely prevented.

BRIEF SUMMARY OF THE INVENTION

In certain embodiments of the present invention, the object relating to the auxiliary device is achieved by means of an auxiliary device of the aforementioned type, in which the auxiliary device comprises a housing comprising a handle, a handling section, and an attaching device. The attaching device is configured for attaching the housing to the electrical work machine, and the handling section is disposed proximate to the attaching device. The handling section comprises an opening that allows at least the tool holder of the electrical work machine to be freely accessible from at least one side of the auxiliary device. The handle is permanently connected to the handling section.

In certain embodiments of the present invention, a system composed of an electrical work machine and an auxiliary device is provided. The electrical work machine is configured for processing mineral material. The electrical work machine comprises a tool holder and a machine housing. The tool holder is for holding a tool. The auxiliary device comprises a housing comprising an attaching device, a base component, a handling section and a handle. The auxiliary device is attachable to the machine housing with the attaching device. The base component comprises a collecting chamber and a front cap. The handling section is disposed between the base component and the attaching device. The handling section comprises an opening configured to allow at least the tool holder to be freely accessible from at least one side of the auxiliary device when the auxiliary device is attached to the electrical work machine. The handle may be permanently connected to the handling section.

It can be considered that an auxiliary device known in the prior art indeed could achieve a protection of the tool holder from dust, shavings or other comminuted material by incorporating a tool holder into a collecting chamber in a completely closed manner. However, an undesirable contact between the tool holder of the electrical work machine and the collecting chamber of the auxiliary device can nonetheless result in an undesirable coupling and optionally noticeable force transfer. One aspect of the present invention is that a large decoupling of the auxiliary device from the electrical work machine, more particularly a decoupling of the tool holder from the collecting chamber, leads to an advantageous construction of the auxiliary device and the system composed of an electrical work machine and the auxiliary device. It should be possible to effectively decouple the tool holder from the collecting chamber even in the case of disadvantageous loads. According to aspects of the concept of the invention, a decoupling is achieved, inter alia, by means of an opening that allows the tool holder to be freely accessible from the sides.

Firstly, the opening that allows the tool holder to be freely accessible from the sides enables a direct access to the tool holder, for example, to detach the tool or the like even when the auxiliary device is attached to the electrical work machine. Secondly, relative movements taking place between the electrical work machine and the auxiliary device as a result of impacts occurring during operation or when the electrical work machine comprising the auxiliary device is put down do not result in the tool holder coming into contact with the collecting chamber since the opening that allows at least the tool holder to be freely accessible from the sides allows sufficient free space for the tool holder relative to the auxiliary device. A disadvantageous force transfer between the auxiliary device and the electrical work machine is thus prevented as far as possible. Moreover, impacts or other shocks are absorbed and damped, and in any case, decoupled as far as possible from the electrical work machine as a result of the construction of the auxiliary device. For this purpose, provision is made according to embodiments of the invention for the handle permanently connected to the handling section and the attaching device to be attached to the electrical work machine by means of the attaching device.

Advantageous developments of certain embodiments of the present invention may be inferred from the dependent claims, which related to advantageous possibilities for implementing the concept explained above within the scope of the object underlying the invention and with regard to further advantages.

In a particularly preferred development, provision is made for the handling section and the attaching, device to be disposed side by side in an axial direction. In doing so, provision is made particularly for the handling section to be directly connected to the handle, which protrudes in the radial direction, and still be disposed axially at a distance from the attaching device. In the preferred development, the handling section is not connected directly to the attaching device, but instead only indirectly connected to the attaching device by means of the handle. According to this development, a free space is provided between the handling section and the attaching device. For example, the auxiliary device is provided with a handling section that is permanently connected to the handle, and the handle is permanently connected to the attaching device. On the whole, this preferably results in a practically U-shaped arrangement of the handling section, the handle, and the attaching device. Such an intrinsically vibratory, U-shaped arrangement enables a particularly advantageous absorption of impacts or the like and prevents or damps disadvantageous couplings between the auxiliary device and the electrical work machine. The housing comprising the handling section, the handle, and the attaching device is preferably formed integrally.

Particularly advantageously, the housing comprises a base component comprising a collecting chamber, the handling section being disposed between the base component and the attaching device. The collecting chamber serves for collecting and optionally transferring comminuted material that results when processing material by means of the tool. A base component can be connected integrally or detachably to the handling section. Additional connecting parts such as a housing top, a suction pipe, and/or a front cap explained further below are preferably connected to the base component. For this purpose, the base component preferably comprises at least one adapter connection.

It has proved particularly advantageous if the handling section comprises at least one opening that allows the tool holder to be freely accessible, particularly from both sides. This makes the tool holder accessible with comparable ease even in the connected state of the auxiliary device so that the user can lock or unlock the same for mounting the tool. There is also an enlarged free space made available for the tool holder, which free space can be utilized if the tool holder is displaced relative to the auxiliary device. An undesirable force-transferring contact between the tool holder and the auxiliary device is thus prevented as far as possible. Particularly preferably, the opening that allows the tool holder to be freely accessible from the sides can be delimited by axially extending axial struts and circumferentially extending annular struts. Thus the handling section can advantageously be provided in the form of an approximately cylindrical section of the housing having comparatively large openings, which section is made of at least one upper and one lower strut as well as a leading annular strut and a trailing annular strut. Furthermore, axial struts and/or annular struts give the handling section a certain absorbing or damping effect between the base component and the handle against impacts or shocks. Forces acting upon the base component or a front cap or any other connecting part such as a suction head or processing head can be damped or absorbed by the handling section so that these forces are transferred in a reduced form or not transferred at all to the housing of the electrical work machine.

It has proved particularly advantageous if the width of the opening that allows the tool holder to be freely accessible from the sides is substantially limited to the extension of the tool holder. As a result, a particularly advantageous compromise is achieved between dust protection on the one hand and the possible handling of the tool holder on the other. In the state, in which the auxiliary device is attached to the electrical work machine, the handling section is preferably located at the height of the tool holder in the axial direction. In doing so, the base component of the auxiliary device is preferably disposed upstream of the tool holder. In particular, a collecting chamber and the base component are disposed upstream of the tool holder in order to achieve the best possible protection of the tool holder from comminuted material. The handle of the auxiliary device is disposed particularly preferably at the height of a neck region disposed between the machine housing and the drive shaft of the tool holder in the mounted state of the auxiliary device. For example, the handle of the auxiliary device can be attached here tightly by means of a pipe clamp or the like.

According to the aforementioned particularly preferred development of aspects of the present invention, the handling section is attached only indirectly by means of the handle and only by means of the attaching device on the handle to the machine housing in the mounted state of the auxiliary device. In the manner explained above, this results in a particularly suitable, impact-absorbing, practically U-shaped arrangement of the handling section, the handle, and the attaching device of the auxiliary device relative to the housing of the electrical work machine. Particularly preferably, the handling section is permanently connected to the handle by means of supporting ribs extending in the axial direction. The supporting ribs particularly preferably have a triangular shape. Thus, an aforementioned, particularly preferred, practically U-shaped arrangement of the handling section, the handle, and the attaching device is formed in a flexible, yet stable manner at the direct junction between the handling section and the handle.

Preferably, at least the handling section and the handle are formed integrally. For example, the handling section and the handle can be provided comparatively easily in the form of a molded component. In a particularly preferred development, the base component can also be formed integrally with the handling section and the handle, more particularly as a molded component. Particularly preferably, a front cap disposed on the base component opposite to the handling section in the axial direction can also be formed integrally with the base component with comparative ease. In particular, the front cap and the base component can be formed integrally with the handling section as well as the handle. The housing of the auxiliary device according to this development is constructed so as to be intrinsically very stable and yet capable of absorbing shocks.

In a development that varies from this development, the base component can comprise at least one adapter connection. Preferably, an adapter connection oriented toward the electrical work machine is provided for the handling section. Preferably, an adapter connection located opposite thereto in the axial direction is provided for a front cap or any other connecting part such as a suction head, processing head or a similar housing top.

In this way, the base component can be designed very flexibly in order to attach various connecting parts such as a front cap, a suction head or a processing head or a similar housing top to the base component, and to detach the same again, if necessary. For example, a base component can be provided with or without suction nozzles. A suction nozzle has a suction connection for a suction pipe. The suction nozzle is very preferably inclined obliquely relative to an axial direction of the base component. The front cap preferably comprises an axial lead-through opening for the tool, which lead-through opening clasps the tool comparatively tightly. A front side of the front cap forms a very advantageous partition that acts against comminuted material so that the tool holder is very well-protected from the entry of comminuted material. A front cap constructed in this way very advantageously forms together with the base component a front cup comprising the collecting chamber for comminuted material.

It has proved advantageous if the material of the handle and/or the handling section is softer than the material of the base component. The effect of impacts and vibrations on the electrical work machine and the user is thus kept comparatively low or damped.

Exemplary embodiments of the invention will now be described hereinafter with reference to the drawings. The drawings are not necessarily intended to be a true-to-scale representation of the exemplary embodiments; rather, the drawings, where they serve to describe the invention, are presented in schematic and/or slightly distorted form. With regard to additions to the teachings which are immediately apparent from the drawings, reference is made to the relevant prior art. It should be borne in mind in this regard that a broad range of modifications and alterations concerning the form and the detail of an embodiment can be carried out without departing from the general idea of the invention. The features of the invention that are disclosed in the foregoing description, in the drawings and in the claims can be instrumental, both individually and in any desired combination, to developing the invention. Moreover, all combinations of at least two of the features disclosed in the description, the drawings and/or the claims are included in the scope of the invention. The general concept of the invention is not limited to the exact form or the detail of the preferred embodiment shown and described hereinafter, or limited to a subject-matter which would be restricted compared to the subject-matter claimed in the claims. For specified ranges of dimensions, values lying within the mentioned limits are also intended to be disclosed as limit values and to be usable and claimable as desired. For the sake of simplicity, the same reference numerals are used hereinafter for identical or similar parts or parts having identical or similar functions.

BRIEF DESCRIPTION OF THE FIGURES

Additional advantages, features and details of the invention are revealed in the following description of the preferred exemplary embodiments and the drawings, in which:

FIG. 1(A) provides a side view of an auxiliary device formed in accordance with an embodiment of the present invention in the form of a dust-protection device;

FIG. 1(B) provides a perspective view of the auxiliary device of FIG. 1(A);

DETAILED DESCRIPTION OF THE INVENTION

Figure 2:
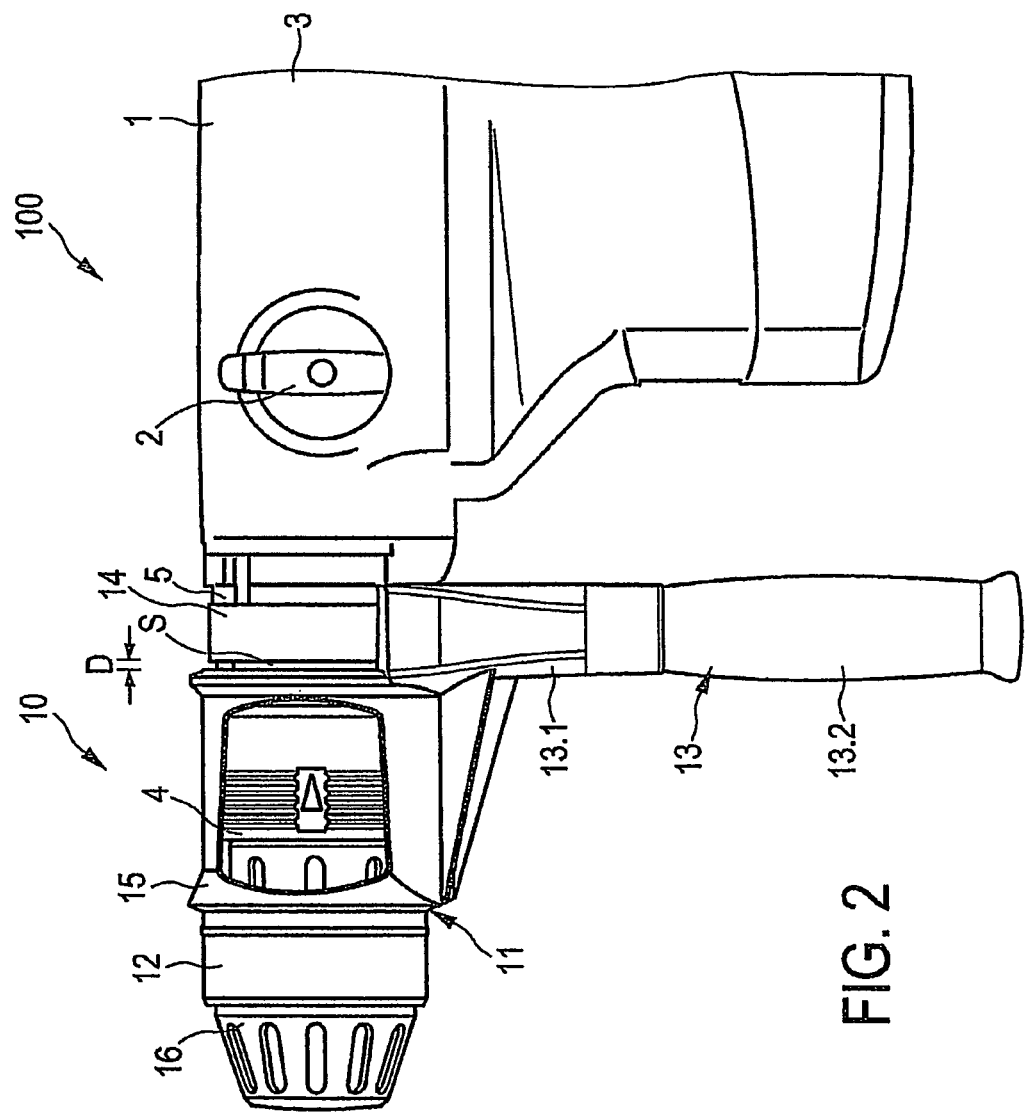
FIG. 2 provides a view of a system formed in accordance with an embodiment of the present invention composed of the auxiliary device shown in FIG. 1 and an electrical work machine, here in the form of a hammer drill-combined machine.

FIG. 1A and FIG. 1B show an auxiliary device 10 in the form of a dust-protection device for an electrical work machine 1 shown in more detail in FIG. 2. FIG. 2 shows the electrical work machine 1 with the auxiliary device 10 mounted thereon in the form of a system 100. The electrical work machine 1 here is in the form of an electrically driven hammer drill-combined machine. The use of the auxiliary device 10 described hereinafter is not limited to hammer drill-combined machines. Rather, the auxiliary device can also be used, for example, for percussion drilling machines or, in this case, very advantageously for chipping hammers. In particular, these and other electrical work machines are used for dismantling, demolition purposes or for remedial actions, especially in interior finishing in order to comminute and/or drill mineral material such as stone, concrete or the like. Here, the electrical work machine 1 in the form of a hammer drill-combined machine comprises a switch 2 that can switch the electrical work machine 1 in various operating states for carrying out percussion drilling, chiseling or hammer drilling operations. The electrical work machine 1 comprises a machine housing 3, in which the electric motor (not shown in detail) is mounted. The electric motor drives a tool (not shown) such as a drill bit or a chisel or the like by means of a shaft, the tool being mounted in a tool holder 4 of the electrical work machine. Here, the chuck of the tool holder 4 to be handled by the user is visible in FIG. 2, which chuck locks the tool in position in the tool holder 4 when actuated appropriately.

The auxiliary device 10 shown in FIG. 1A and FIG. 1B in the form of a dust-collecting device substantially comprises a housing 11 (visible in the figures), which is largely formed integrally as a molded component. The housing 11 has a base component 12, a handle 13, and an attaching device 14. The dust-collecting device is attached tightly to a neck region 5 of the housing 3 of the electrical work machine 1 by means of the attaching device 14 that is in the form of a gripper clamp in this case. The neck region 5 practically forms the front terminal region of the machine housing 3, which terminal region is disposed nearest to the tool holder 4. Furthermore, the housing 11 of the auxiliary device 10 that is in the form of the dust-collecting device comprises a handling section 15 disposed between the base component 12 and the attaching device 14 on one side of the base component 12, and a front cap 16, which is fixed to the base component 12 and is disposed opposite to the handling section 15 in the axial direction on the other side of the base component. The base component 12 can, but need not, be fixed to the handling section 15 so as to form a single piece therewith. The front cap 16 can, but need not, be fixed to the base component 12 so as to form a single piece therewith. A collecting chamber (not visible in more detail) is formed in the front cup formed by the front cap 16 and the base component 12. The collecting chamber serves for collecting dust or similar comminuted material formed during the drilling and/or chiseling operations. As for the rest, a front side 18 of the front cap 16 comprises a lead-through opening 17, which is configured to be comparatively narrow relative to the tool so that the front side 18 forms an effective dust-protection partition in order to largely prevent the entry of dust into the tool holder 4. Any dust that may still enter by way of the front side 18 can remain in the aforementioned collecting chamber disposed in the front cap 16 and the base component 12.

Furthermore, the handling section 15 comprises a first opening 19.1 and a second opening 19.2 that allow the tool holder 4 to be freely accessible from both sides. The top and bottom edges 22.1, 22.2 of the first and the second openings 19.1, 19.2 are delimited here by an upper axially extending strut 21.1 and a lower axially extending strut 21.2 respectively. Furthermore, the leading edge and trailing edge 23.1, 23.2 of the first and the second openings 19.1, 19.2 in the axial direction A are each delimited by circumferentially extending annular struts 24.1, 24.2 of the handling section 15. The first and the second opening 19.1, 19.2 of the handling section 15 enable the tool holder 4 to be accessible to the user from both sides. Even when the auxiliary device 10 is mounted on the electrical work machine, a tool can be removed easily from or inserted into the tool holder 4 in that the tool holder 4 is actuated, that is, either released or locked in position by means of the openings 19.1, 19.2 of the handling section 15.

Furthermore, the tool holder 4 provides a sufficient lateral free space or spare space due to the first and the second openings 19.1, 19.2. The auxiliary device 10 could thus be moved to a considerable extent relative to the tool holder 4 as a result of an impact without this movement resulting in an undesirable force-transferring contact between the tool holder 4 and the auxiliary device 10. This primarily prevents a rotating component of the tool holder 4 from rubbing against the housing 11 of the auxiliary device 10 and entraining the same or causing the same to rotate. In this respect, the first and the second openings 19.1, 19.2 in the handling section 15 of the housing 11 enable a decoupling of the electrical work machine 1 from the auxiliary device 10 with regard to undesirable relative movements thereof.

Furthermore, the base component 12, the handling section 15, and the attaching device 14 are disposed side by side in an axial direction A shown in FIG. 1A, the handle 13 protruding from the attaching device 14 in a radial direction R likewise shown in FIG. 1A. The handling section 15 is directly connected to the radially protruding handle 13—in this case, by means of two triangular supporting ribs 25.1, 25.2 disposed on the top 13.1 of the handle 13, which top is located between the hand piece 13.2 and the attaching device 14. By contrast, the handling section 15 is disposed next to the attaching device 14 at a distance D therefrom. In other words, there is a gap S between the attaching device 14 and the handling section 15. This leads to a substantially U-shaped arrangement of the handling section 15, the handle 13, and the attaching device 14. This comparatively stable and yet vibratory U-shaped arrangement achieved by means of the struts 25.1, 25.2 enables undesirable impacts, vibrations or the like to be damped particularly advantageously in the auxiliary device 10 so that these shocks and vibrations can be transferred in a reduced form or not transferred at all to the housing 3 of the electrical work machine 1. Forces acting upon the front cap 16, the base component 12 or the handling section 15 can be compensated for by altering the distance D of the gap S.

The combination of an opening 19.1, 19.2 that is located on the handling section 15 and that allows the tool holder 4 to be freely accessible from the sides with the merely indirect attachment of the handling section 15 to the attaching device 14 while leaving a gap S realizes a particularly advantageous decoupling of the auxiliary device 10 from the electrical work machine 1. Lastly, it leads to an extremely low stress of the housing 3 of the electrical work machine 1 and a more convenient handling of the system by the user holding the electrical work machine 1 by means of the handle 13. In order to allow more convenience in the handling of the system 100, at least the hand piece 13.2 of the handle 13 in this embodiment—optionally also the top 13.1 and/or a handling section 15 in a modified embodiment—is made of a softer material than, for example, the base component 12 or the attaching device 14 of the housing 11.

Figure 3:
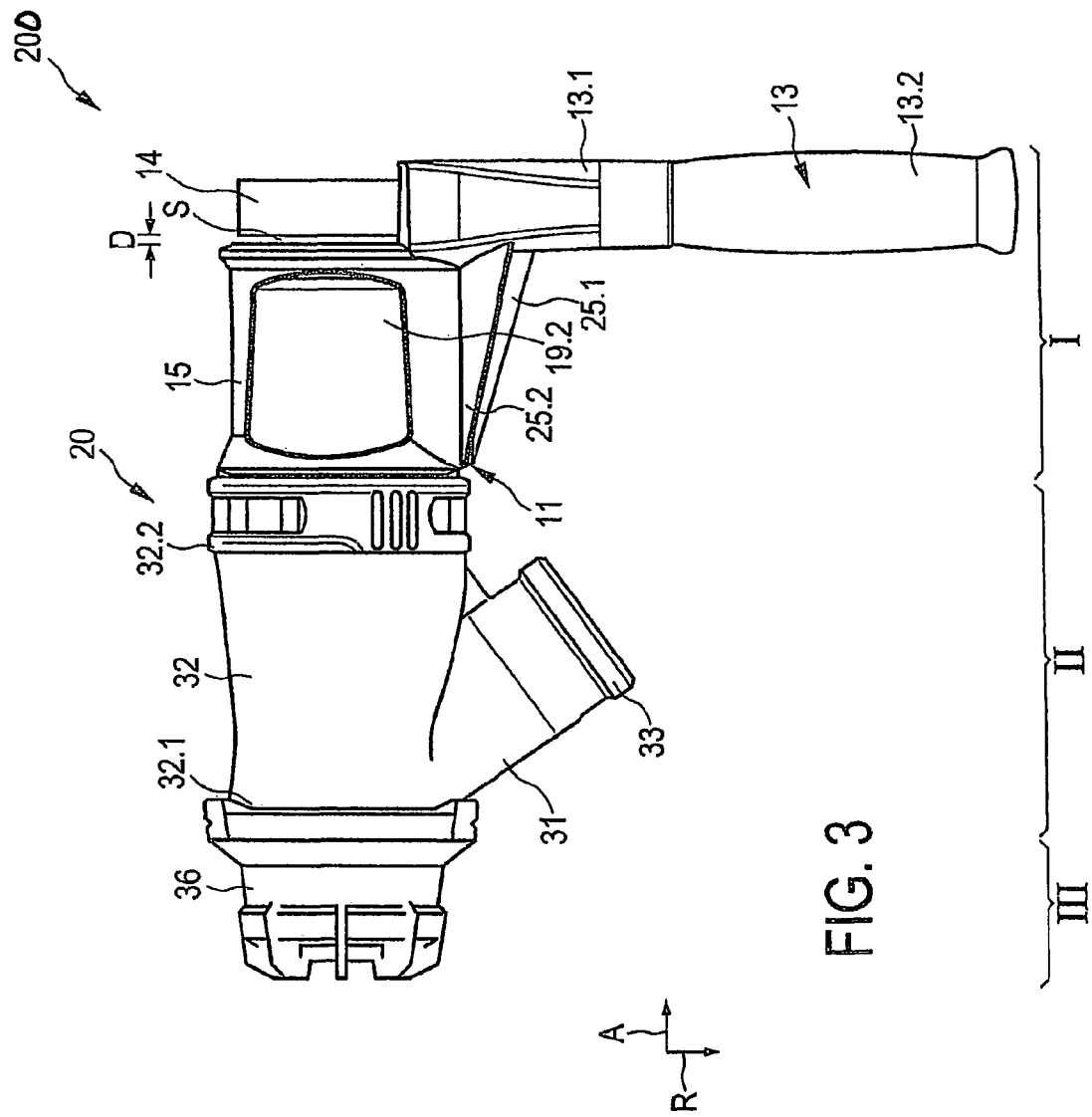
FIG. 3 is a side view of a second embodiment of an auxiliary device in the form of a dust-exhaust system, the base component comprising a suction nozzle and an adapter connection for the handling section and a front cap.
Figure 4:
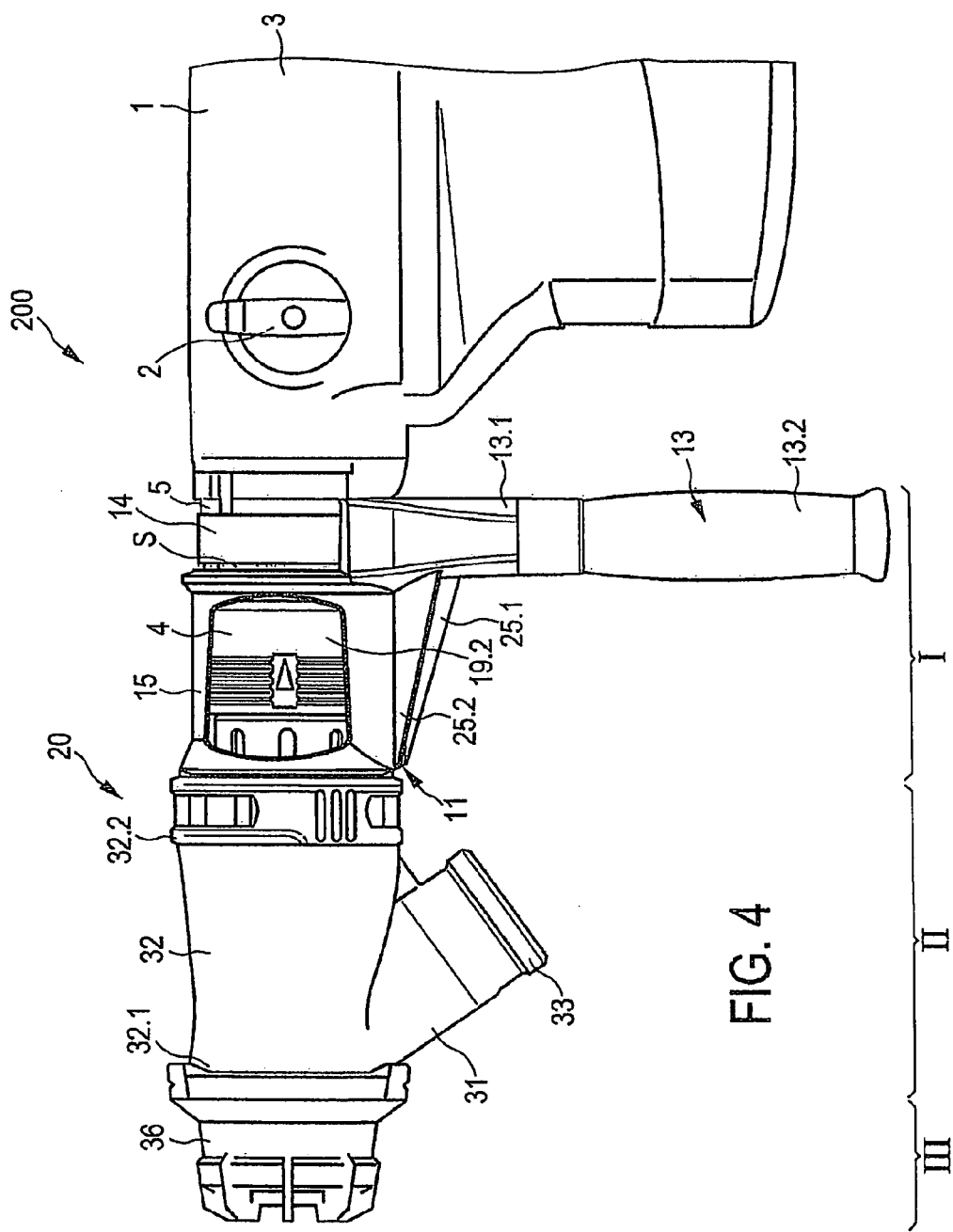
FIG. 4 shows a system formed in accordance with an embodiment of the present invention composed of an electrical work machine, here in the form of a hammer drill-combined machine with the auxiliary device shown in FIG. 3 mounted thereon.

FIG. 3 shows a modified embodiment of an auxiliary device 20, which is shown in FIG. 4 together with the aforementioned electrical work machine 1 in the form of a system 200. Identical reference numerals are used hereinafter, wherever advantageous, for identical or similar components or components having identical or similar functions. The basic construction of the handling section 15, the handle 13, and the attaching device 14 of the auxiliary device 20 substantially corresponds to that of the auxiliary device 10 explained with reference to FIG. 1A to FIG. 2. The handling section 15, the handle 13 and, to a limited extent, the attaching device 14 are formed integrally in the case of both auxiliary devices 10, 20.

Furthermore, as a variant of the auxiliary device 10, this auxiliary device 20 shown in FIG. 3 and FIG. 4 is in the form of a dust-exhaust system. For this purpose, a modified base component 32 of the auxiliary device 20 comprises a suction nozzle 31, to the suction connection 33 of which a suction pipe (not shown) and a suction device can be attached. Any dust entering by way of the likewise modified front cap 36 can thus not only be collected in a collecting chamber disposed in the front cup formed by the front cap 36 and the base component 32, but can also be extracted by means of the suction nozzle 31.

The auxiliary device 10 shown in FIG. 1A to FIG. 2 can be formed integrally with the handling section, the handle 13, the attaching device 14 as well as the base component 12, and the front cap 16. In one variant, the front cap 16 and the base component 12 can also be attached to each other so as to be removable. Likewise, the base component 12 can be mounted on the handling section 15 so as to be detachable therefrom. The modified auxiliary device 20 provides a first adapter connection 32.1 and a second adapter connection 32.2 on the base component 32. By means of the adapter connections 32.1 and 32.2, the front cap 36 and the handling section 15 respectively can be mounted on the base component so as to be detached therefrom. In other words, the base component 32 can be removed from the handling section 15 by opening the adapter connections 32.1 or 32.2. Likewise, the front cap 36 can be removed from the base component 32.

In an embodiment not shown in detail here, the thus remaining handling section 15, handle 13, and attaching device 14 of the auxiliary device 20 can be fitted with a base component other than the one 32 shown in FIG. 3 and FIG. 4—for example, a base component 12 provided with an adapter connection and comprising a front cap 16 shown in FIG. 1A to FIG. 2. Basically, sections II and III of an auxiliary device 10, 20 can be attached, if necessary, to section I—namely, to the integrally formed housing part comprising the handling section 15, the handle 13, and the attaching device 14—while providing corresponding adapter connections on the base component 32 or the base component 12 or on the front cap 16 or the front cap 36. Thus a base component 32 provided with a suction nozzle 31 or a simple base component 12 can be connected optionally to the handling section 15 of an auxiliary device 10 or an auxiliary device 20. Likewise, different front caps 16 or 36 or other housing tops can be provided for purposes of replacement, if necessary.

The invention claimed is:

1. An auxiliary device for an electrical work machine including a tool that is held in a tool holder, the auxiliary device comprising:
a housing, the housing comprising a handle, a handling section and an attaching device, the attaching device configured for attaching the housing to the electrical work machine, wherein the handling section is disposed proximate to the attaching device, the handling section comprising an opening that allows at least the tool holder of the electrical work machine to be freely accessible from at least one side of the auxiliary device, the handle permanently connected to the handling section, wherein the opening is delimited by axially extending axial struts and circumferentially extending annular struts.

2. The auxiliary device of claim 1, wherein the handling section and the attaching device are disposed side by side in an axial direction, the handling section being directly connected to the handle, the handle protruding in a radial direction, and the handling section being disposed axially at a distance from the attaching device.

3. The auxiliary device of claim 1, wherein the housing comprises a base component comprising a collecting chamber, and wherein the handling section is disposed between the base component and the attaching device.

4. The auxiliary device of claim 1, wherein the handling section is permanently connected to the handle by triangular supporting ribs extending in an axial direction.

5. The auxiliary device of claim 1, wherein the handling section and the handle are formed integrally.

6. The auxiliary device of claim 1, wherein the housing comprises a front cap comprising an axial lead-through opening for the tool.

7. The auxiliary device of claim 1, comprising a base component that is formed integrally on the handling section.

8. The auxiliary device of claim 1, comprising a base component comprising a detachable adapter connection for connecting the base component to the handling section.

9. The auxiliary device of claim 1, comprising a base component, wherein the material of the handle is softer than the material of the base component.

10. The auxiliary device of claim 1, comprising a base component, wherein the material of the handling section is softer than the material of the base component.

11. An auxiliary device for an electrical work machine including a tool that is held in a tool holder, the auxiliary device comprising:
a housing, the housing comprising a handle, a handling section and an attaching device, the attaching device configured for attaching the housing to the electrical work machine, wherein the handling section is disposed proximate to the attaching device, the handling section comprising an opening that allows at least the tool holder of the electrical work machine to be freely accessible from at least one side of the auxiliary device, the handle permanently connected to the handling section, comprising a base component comprising a suction nozzle to which a suction pipe can be connected.

12. The auxiliary device of claim 11, wherein the suction nozzle is inclined obliquely relative to an axial direction of the base component.

13. A system comprising:
electrical work machine configured for processing mineral material and comprising a tool holder and a machine housing, the tool holder for holding a tool; and
an auxiliary device comprising a housing comprising an attaching device, a base component, a handling section, and a handle, the auxiliary device attachable to the machine housing with the attaching device, the base component comprising a collecting chamber and a front cap, the handling section being disposed between the base component and the attaching device, the handling section comprising an opening configured to allow at least the tool holder to be freely accessible from at least one side of the auxiliary device when the auxiliary device is attached to the electrical work machine, the handle permanently connected to the handling section.

14. The system of claim 13, wherein the width of the opening which allows the tool holder to be freely accessible from the at least one side is substantially limited to the extension of the tool holder.

15. The system of claim 13, wherein the handling section is attached only indirectly by means of the handle and the attaching device on the handle to the machine housing.

16. The system of claim 13, wherein the base component is configured for attachment of a suction device by an adapter connection.

* * * * *